(12) United States Patent
Hiranuma et al.

(10) Patent No.: US 6,378,469 B1
(45) Date of Patent: Apr. 30, 2002

(54) ENGINE GENERATING MACHINE

(75) Inventors: Junji Hiranuma; Minoru Tamura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,590

(22) Filed: Jul. 10, 2000

(30) Foreign Application Priority Data

Jul. 12, 1999 (JP) ............................................ 11-197831

(51) Int. Cl.[7] .................................................. F01P 1/00
(52) U.S. Cl. .................................. 123/41.56; 123/195 C
(58) Field of Search .......................... 123/41.56, 195 C

(56) References Cited

U.S. PATENT DOCUMENTS 4,907,546 A * 3/1990 Ishii et al. ................ 123/41.56

FOREIGN PATENT DOCUMENTS

JP          1-21399          4/1989

* cited by examiner

*Primary Examiner*—Tony M. Argenbright
*Assistant Examiner*—Katrina B. Harris
(74) *Attorney, Agent, or Firm*—Arent Fox Kintner Plotkin & Kahn, PLLC

(57) ABSTRACT

In an engine generating machine, a power-generating unit constructed by integration of the an engine and a generator, is housed in a case including an undercover and a pair of left and right side covers. A pair of reinforcing frames are coupled at their lower ends to the undercover and extend upwards along inner surfaces of the left and right side covers. The reinforcing frames have upper ends coupled to each other and are commonly fastened to a carrying handle. A fuel tank is supported inside the reinforcing frames, and a fuel pump and a fuel cock are mounted on the reinforcing frames. Thus, the maintenance of a fuel supply system for the engine can be facilitated, and the fuel tank can be protected while avoiding an increase in weight.

9 Claims, 13 Drawing Sheets

ENGINE GENERATING MACHINE

BACKGROUND OF THE INVENTION

1. Field of the Invention

The present invention relates to a portable engine generating machine including a power-generating unit which is constructed by integration of an engine and a generator driven by the engine and which is positioned in a sound-insulating case.

2. Description of the Related Art

A portable engine generating machine is known which includes an engine and a generator positioned in a case made of a synthetic resin, and designed so that it is carried by grasping a carrying handle provided at an upper portion of the case. When the engine generating machine is lifted by grasping the carrying handle, the weight of the engine and the generator, which are heavy members, are applied to a bottom of the case. For this reason, it is necessary to provide the case with sufficient rigidity to prevent the deformation of the case. However, if an attempt is made to enhance the rigidity of the case itself, the weight of the case is increased, resulting not only in an increase in weight of the entire engine generating machine, but also in a limited degree of design choice for the shape and the material of the case.

Therefore, an engine generating machine is known from Japanese Patent Publication No. 1-21399, which is designed such that a pair of front and rear loop-shaped frame members are connected to each other at their upper and lower portions by the carrying handle as well as by a bottom cover, respectively, thereby forming a firm frame, and the engine and generator are supported on the frame, whereby the load is prevented from being applied to a cover covering the frame.

However, the above known machine suffers from the following problem: To support the weight of the engine and the generator, it is necessary for each of the front and rear frame members forming the frame, the carrying handle and the bottom cover to have a sufficient rigidity. For this reason, it is difficult to sufficiently reduce the weight of these members, and also the shape and material of the frame are limited, resulting in a decreased degree in the freedom of the design. Therefore, in a prior art machine, the frame is omitted, and the power-generating unit is supported directly on the case, as described above. In this case, however, the following problem is encountered: If parts for a fuel supply system such as a fuel tank, a fuel pump, a fuel cock and the like are supported on the case, the operation for removing the case from the power-generating unit is troublesome and as a result, the operability for maintenance is reduced remarkably.

SUMMARY OF THE INVENTION

Accordingly, it is an object of the present invention to provide an engine generating machine including a power-generating unit which is constructed by integration of an engine and a generator driven by the engine and which is positioned or housed in a case, wherein the maintenance for the fuel supply system of the engine is facilitated, and the fuel tank is protected, while avoiding an increase in weight.

To achieve the above object, according to a first aspect and feature of the present invention, there is provided an engine generating machine comprising a power-generating unit which is constructed by integration of an engine and a generator driven by the engine and which is positioned in a case, wherein the case includes, at least, an undercover, and a pair of side covers coupled to left and right opposite sides of the undercover. The engine generating machine includes a pair of left and right reinforcing frames which are coupled at their lower ends to the undercover and which extend upwards along inner surfaces of the left and right side covers. The upper ends of the left and right reinforcing frames are coupled to each other, and a fuel tank is supported inside the reinforcing frames, and a fuel pump and a fuel cock are attached to the reinforcing frames.

With the above arrangement, the fuel tank is disposed inside the pair of left and right frames which are coupled at their lower ends to the undercover and extend along the inner surfaces of the left and right side covers, and which have the upper ends coupled to each other. Therefore, the fuel tank can be surrounded and protected by the relatively lightweight reinforcing frames without provision of a firm frame covering the entire engine generating machine. Moreover, since the fuel pump and the fuel cock are attached to the reinforcing frames, the fuel pump and the fuel cock can be supported utilizing the reinforcing frames without provision of a special support member. In addition, a fuel supply system comprised of the fuel tank, the fuel pump and the fuel cock is supported on the undercover through the reinforcing frames and hence, the maintenance of the fuel supply system and the power-generating unit can be carried out by removing the side cover from the undercover without interference with the fuel supply system.

According to a second aspect and feature of the present invention, there is provided an engine generating machine, wherein the coupled portions at the upper ends of the pair of left and right reinforcing frames are commonly fastened to a carrying handle provided at an upper portion of the case, and the fuel tank is clamped between the pair of left and right reinforcing frames.

With the above arrangement, the coupled portions at the upper ends of the pair of left and right reinforcing frames are commonly fastened to the carrying handle provided at the upper portion of the case. Therefore, not only can the case be reinforced by the reinforcing frames, but also the weight of the power-generating unit can be transmitted from the undercover through the reinforcing frames to the carrying handle, whereby the load applied to the case can be reduced. In addition, the fuel tank is clamped between the reinforcing frames provided in a laterally bisected manner and hence, the fuel tank with the increased weight from filling with fuel can be supported firmly on the reinforcing frames.

According to a third aspect and feature of the present invention, there is provided an engine generating machine, wherein an inverter unit is disposed below the fuel tank, and a vibration-damping member mounted on an upper surface of the inverter unit, is opposed to a lower surface of the fuel tank.

With the above arrangement, the vibration-damping member is mounted on the upper surface of the inverter unit disposed below the fuel tank. Therefore, the fuel tank swelled by the supplying of fuel or hung down by the weight of the fuel, can be supported reliably and softly on the inverter unit through the vibration-damping member.

According to a fourth aspect and feature of the present invention, there is provided an engine generating machine, wherein the power-generating unit includes a rigid fan cover which covers the generator and which is supported in a cantilever manner on the engine. An upper portion of the engine is connected to the carrying handle provided at an upper portion of the case through a vibration-damping member, and a lower portion of the engine and a lower portion of the fan cover are connected to the undercover through a vibration-damping member, whereby the power-generating unit is resiliently supported on the case.

With the above arrangement, the upper portion of the engine, the lower portion of the engine and the lower portion of the fan cover are connected to the case through the vibration damping members. Therefore, the weight of the power-generating unit can be dispersed to various portion of the case, thereby preventing the concentration of a load. In particular, when the carrying handle has been lifted, the weight of the power-generating unit is supported directly on the carrying handle without being applied to the case. Therefore, it is unnecessary to specially reinforce the case, thereby enabling a reduction in weight, and also providing an increase in degree of freedom in the design of the shape and material of the case. Moreover, the vibration-damping member ensures the inhibition of the vibration of the engine transmitted to the case.

The above and other objects, features and advantages of the invention will become apparent from the following description of the preferred embodiment taken in conjunction with the accompanying drawings.

BRIEF DESCRIPTION OF THE DRAWINGS

FIGS. 1 to 13 show one embodiment of the present invention, wherein

FIG. 1 is a side view of the entire arrangement of an engine generator.

FIG. 2 is a view taken along a line 2—2 in FIG. 1.

FIG. 3 is a sectional view taken along a line 3—3 in FIG. 2.

FIG. 4 is a sectional view taken along a line 4—4 in FIG. 2.

FIG. 5 is a sectional view taken along a line 5—5 in FIG. 3.

FIG. 6 is a view taken in a direction of an arrow 6 in FIG. 3.

FIG. 7 is a view taken along a line 7—7 in FIG. 5.

FIG. 8 is a sectional view taken along a line 8—8 in FIG. 3.

FIG. 9 is a view taken in a direction of an arrow 9 in FIG. 3.

FIG. 10 is an enlarged view of an area indicated by 10 in FIG. 3.

FIG. 11 is a sectional view taken along a line 11—11 in FIG. 10.

FIG. 12 is an enlarged view of an area indicated by 12 in FIG. 5.

FIG. 13 is an exploded perspective view of the engine generator.

DESCRIPTION OF THE PREFERRED EMBODIMENT

Figure 1:
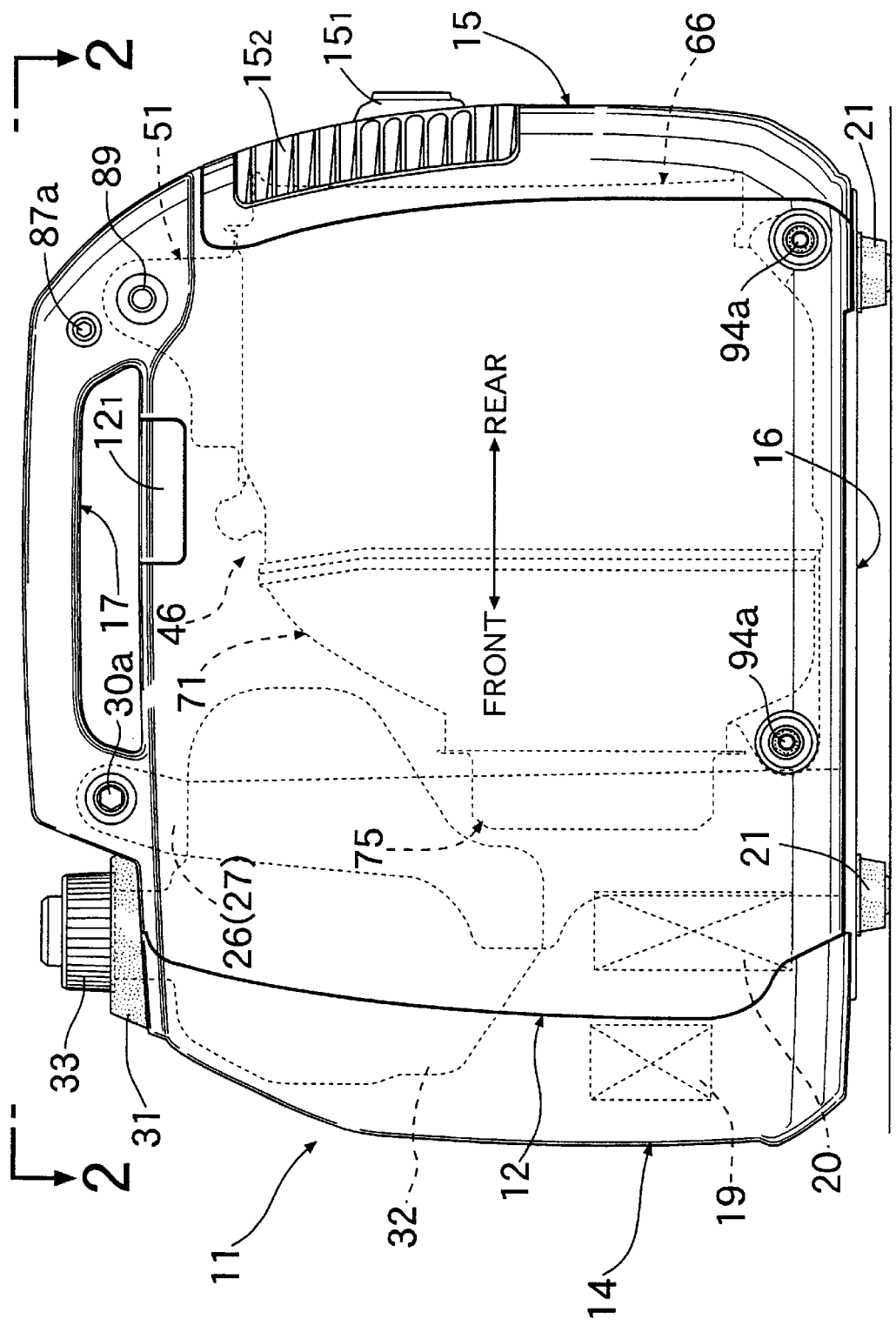
Figure 2:
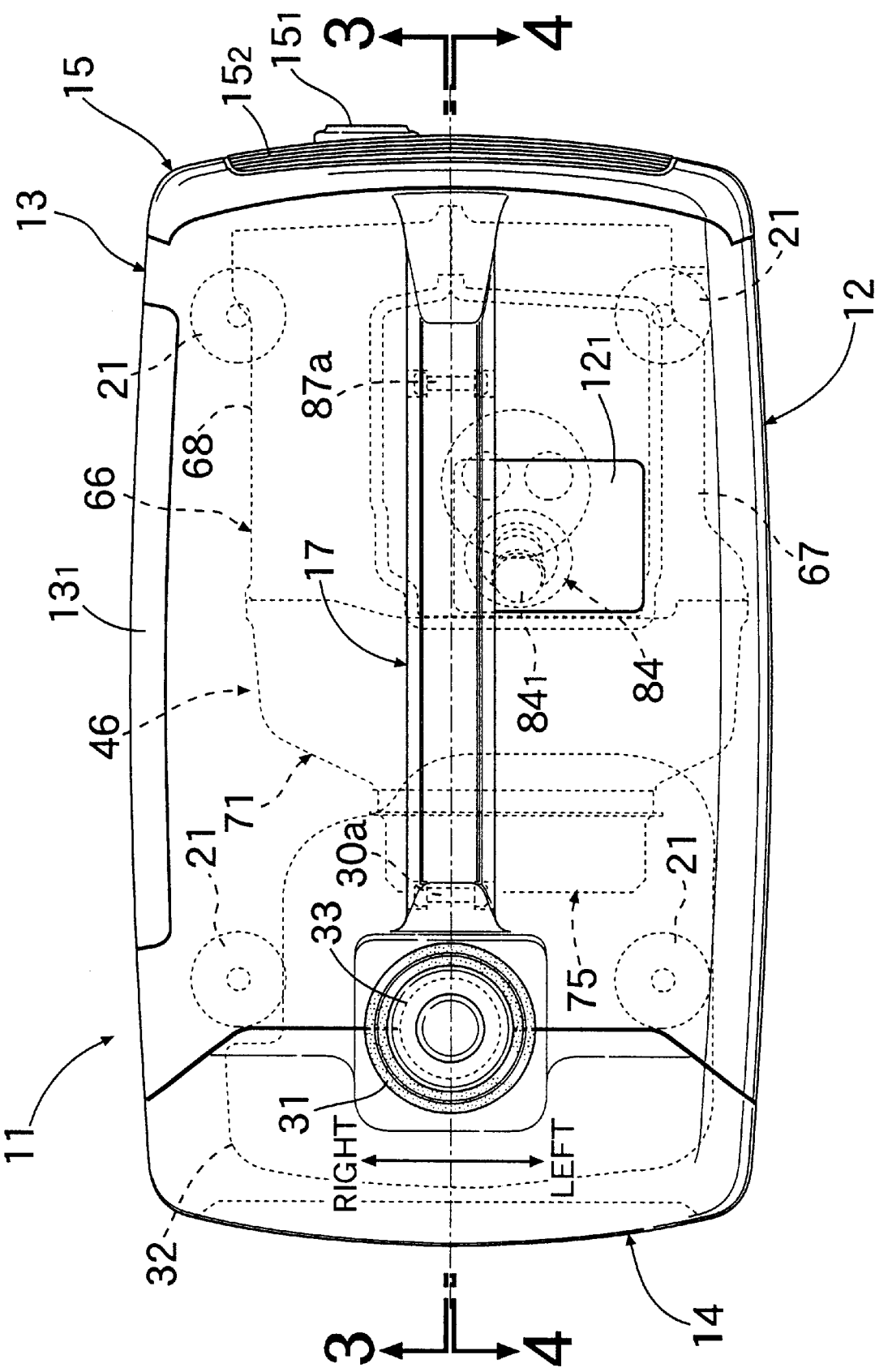
Figure 3:
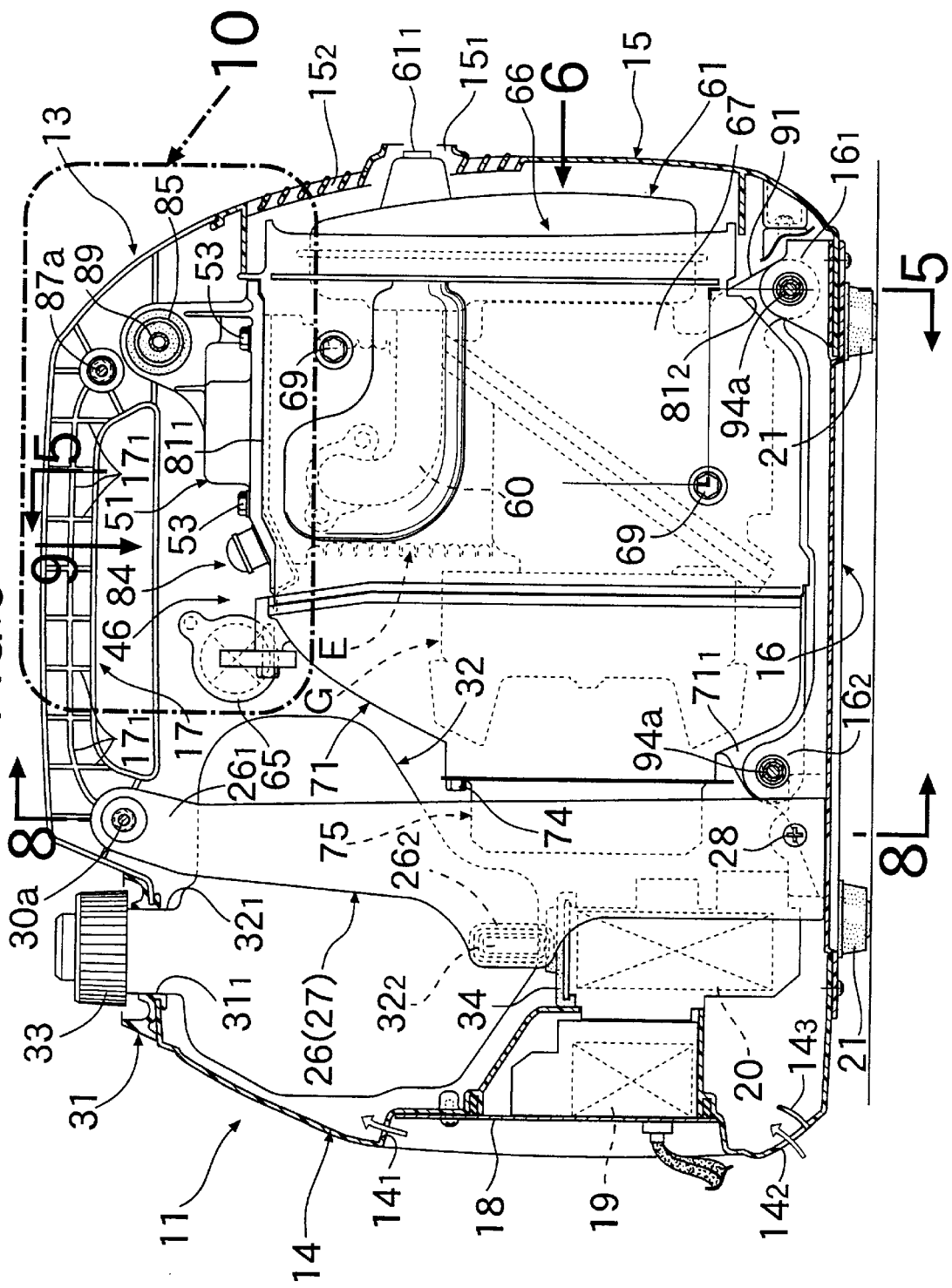

The present invention will now be described by way of embodiments with reference to the accompanying drawings.

FIGS. 1 to 13 show an embodiment of the present invention.

As shown in FIGS. 1 to 4 and 13, a case 11 made of a synthetic resin, which forms an outer profile of an engine generator for generating electric power by driving a generator G with an engine E, is comprised of a left side cover 12, a right side cover 13, a front cover 14, a rear cover 15 and an undercover 16. A carrying handle 17 for carrying the engine generator is provided at upper portions of the left and right side covers 12 and 13 integrally formed therewith, and reinforcing ribs $17_1$, are formed in a lattice shape within the carrying handle 17 (see FIGS. 3 and 4). A spark plug replacing lid $12_1$, is formed on the left side cover 12, and slit-shaped cooling-air introducing ports $12_3$ are defined in the left side cover 12. A maintenance lid $13_1$, is formed on the right side cover 13. The front cover 14 is provided with an operating panel 18, a control unit 19 mounted at a rear portion of the operating panel 18 for controlling the operations of the engine E and the generator G, and an inverter unit 20 mounted in the rear of the control unit 19 for controlling an output frequency from the generator G. The rear cover 15 is provided with an exhaust gas discharge port $15_1$, for discharging exhaust gas from the engine E, and a cooling-air discharge port $15_2$ for discharging cooling-air from the case 11. The undercover 16 is provided with four support legs 21 made of a rubber, which are intended to abut against a ground surface or a floor surface upon placement of the engine generator.

The operating panel 18, the control unit 19 and the inverter unit 20 forming a control system of the engine generator are arranged in a collected manner on the front cover 14. Therefore, not only the length of a wire harness can be shortened, but also the maintenance of the control system can be carried out collectively by only removing the front cover 14.

The case 11 is provided at its front portion with a left reinforcing frame 26 and a right reinforcing frame 27, each of which is formed of FRP into an inverted L-shape. The left reinforcing frame 26 fixed at its lower end to a left side of the undercover 16 by a bolt 28, rises upwards and laterally inwards along an inner surface of the left side cover 12, and has an upward-folded mounting portion $26_1$ formed at an upper end thereof. The right reinforcing frame 27 fixed at its lower end to a right side of the undercover 16 by a bolt 29, rises upwards and laterally inwards along an inner surface of the right side cover 13, and has an upward-folded mounting portion $27_1$ formed at an upper end thereof. The left and right frames 26 and 27 form a gate-shape as a whole. The superposed mounting portions $26_1$ and $27_1$ are clamped commonly by threadedly fitting a bolt 30a inserted therein from the side of the left side cover 12 into an embedded nut 30b of the right side cover 13, in a condition in which they have been sandwiched between the left and right side covers 12 and 13 in front of the carrying handle 17 (see FIG. 8).

A seal member 31 made of a rubber is mounted at a location in which the upper surfaces of the left and right covers 12 and 13 and the front cover 14 are joined together. A fuel tank 32 is disposed above the inverter unit 20 and has an oil supply port $32_1$ closed by a cap 33 which is detachably mounted to extend upwards through an opening $31_1$ in the seal member 31. The fuel tank 32 is positioned, so that it is not swung, by loosely fitting projections $32_2$ and $32_3$ provided on both of the left and right side faces of the fuel tank 32 into fuel tank support portions $26_2$ and $27_2$ defined in the left and right reinforcing frames 26 and 27. A lower vibration-damping member 34 made of a rubber, is mounted on an upper surface of the inverter unit 20 and opposed to a lower surface of the fuel tank 32 with a small gap provided therebetween. When the fuel tank 32 supplied with fuel is swelled and deformed downwards by the weight of the fuel, the lower surface of the fuel tank 32 comes into abutment against an upper surface of the lower vibration-damping member 34, whereby the weight of the fuel tank 32 is supported on the inverter unit 20.

In this manner, the fuel tank 32 is supported in such a manner that it is sandwiched from the left and right between the left and right side covers 12 and 13. Therefore, the fuel tank 32 can be demounted by only separating the left and right side covers 12 and 13 from each other without an operation such as detachment of the bolt. Moreover, since the fuel tank 32 is surrounded by the left and right reinforcing frames 26 and 27, the fuel tank 32 can be protected from a shock applied thereto from the outside. The left and right reinforcing frames 26 and 27 do not cover the entire engine generator and hence, a substantial increase in weight is not brought about.

An electrically-operated fuel pump 35 is mounted on an upper surface of an upper portion of the right reinforcing frame 27 for feeding the fuel in the fuel tank 32 to the engine E, and a fuel cock 36 and an engine switch 42 are mounted on an outer side of a lower portion of the right reinforcing frame 27 for cutting off the feeding of the fuel to the engine E. A control knob $36_1$ for opening and closing the fuel cock 36 passes through the right side cover 13 and is exposed to the outside. In this way, the fuel pump 35 and the fuel cock 36 are supported utilizing the right reinforcing frame 27 and hence, a special support member is not required, thus resulting in a reduction in number of parts. Moreover, the fuel tank 32, the fuel pump 35, the fuel cock 36 and the like comprising a fuel supply system, are supported in a collected manner on the left and right reinforcing frames 26 and 27 rather than on the left and right side frames 12 and 13. Therefore, for the purpose of maintenance of the fuel supply system, the left and right side frames 12 and 13 can be removed easily.

Figure 4:
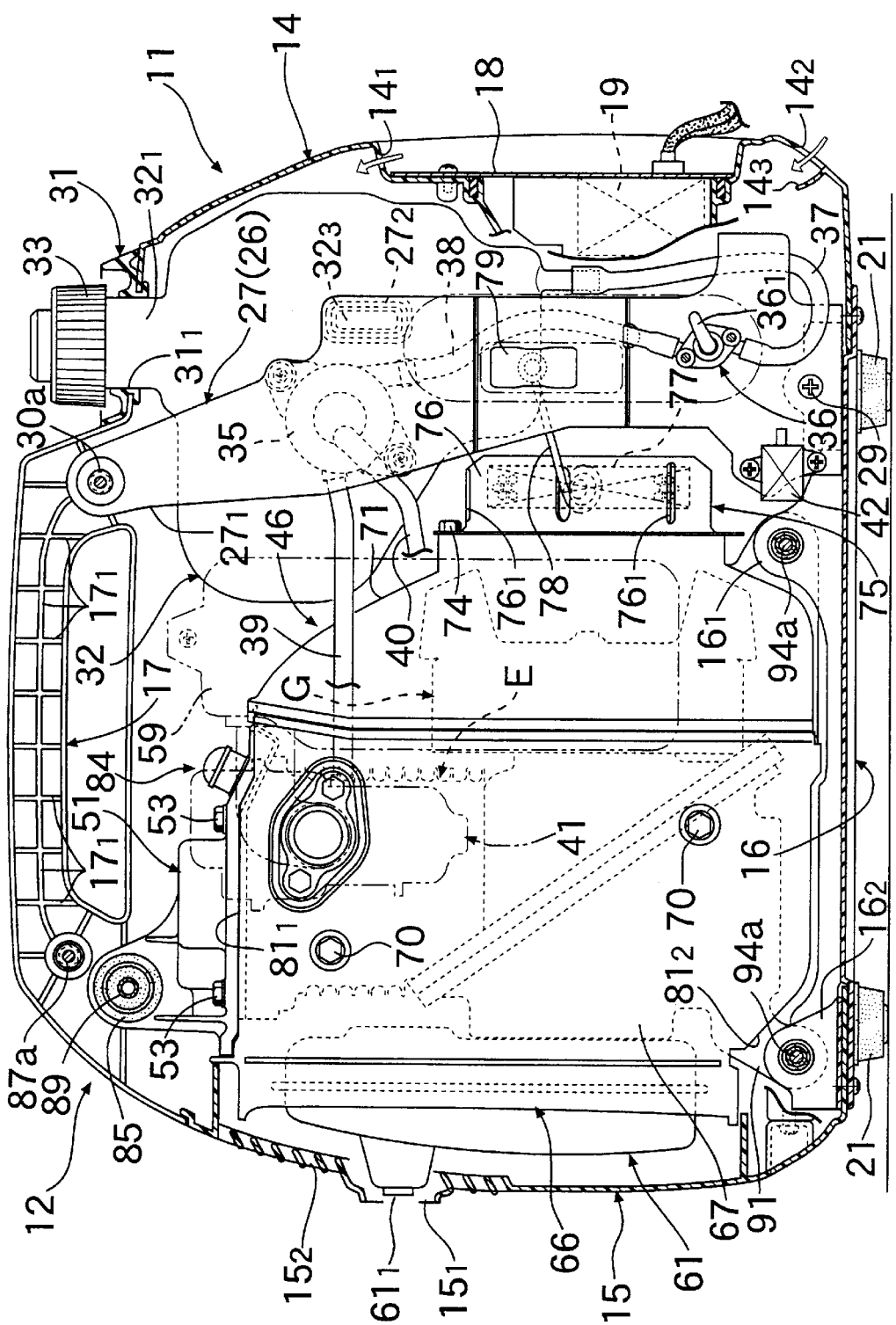
Figure 5:
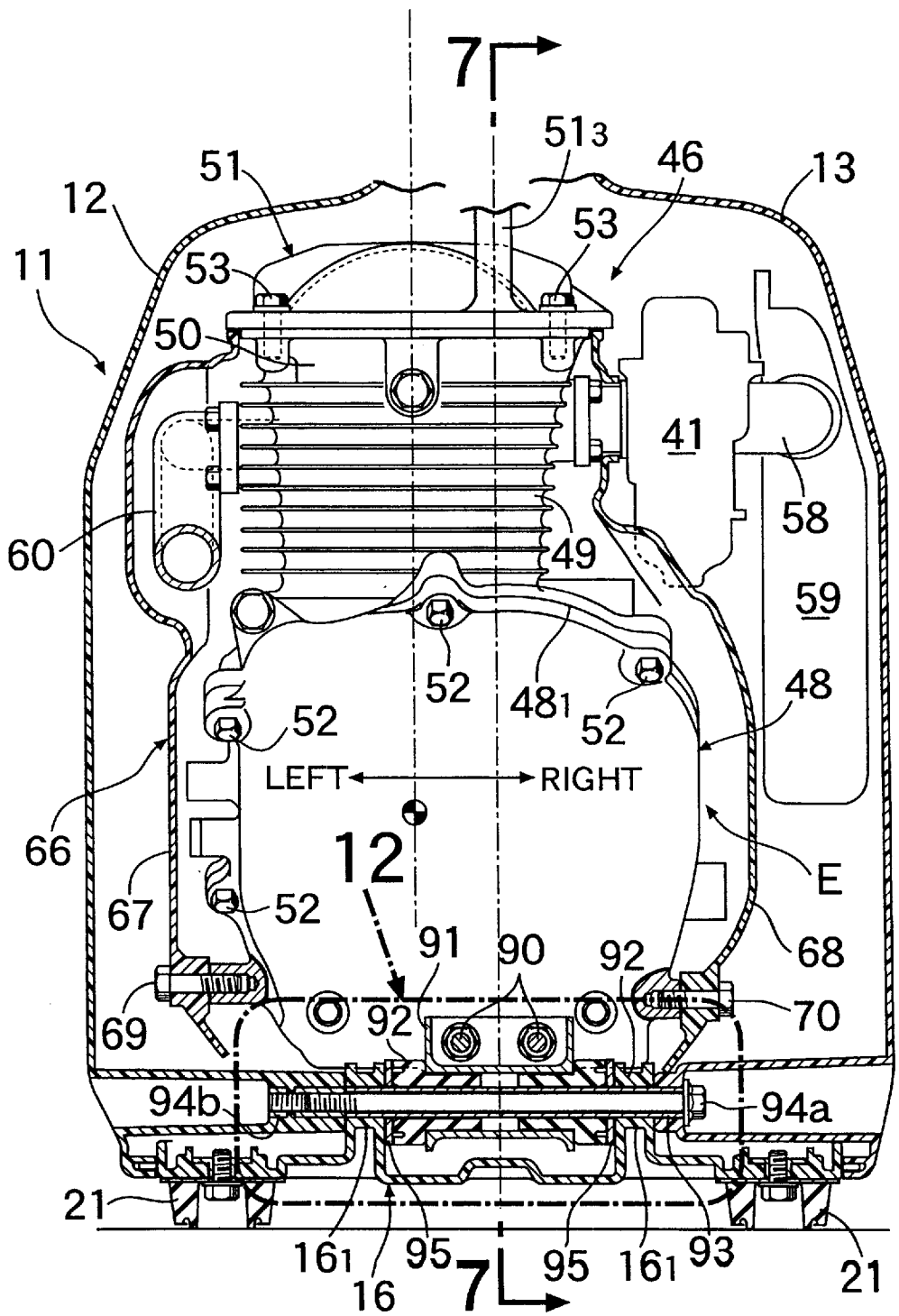

In FIG. 4, reference character 37 is a fuel tube for supplying the fuel from the fuel tank 32 to the fuel cock 36; 38 is a fuel tube for supplying the fuel from the fuel cock 36 to the fuel pump 35; 39 is a fuel tube for supplying the fuel from the fuel pump 35 to a carburetor 41; and 40 is a tube for transmitting the pulsation of an internal pressure in a crankcase of the engine E to a diaphragm (not shown) within the fuel pump 35 to drive the fuel pump 35.

A power generating unit 46 comprising the engine E and the generator G connected integrally to each other, will be described below with reference to FIGS. 5 to 13.

Figure 7:
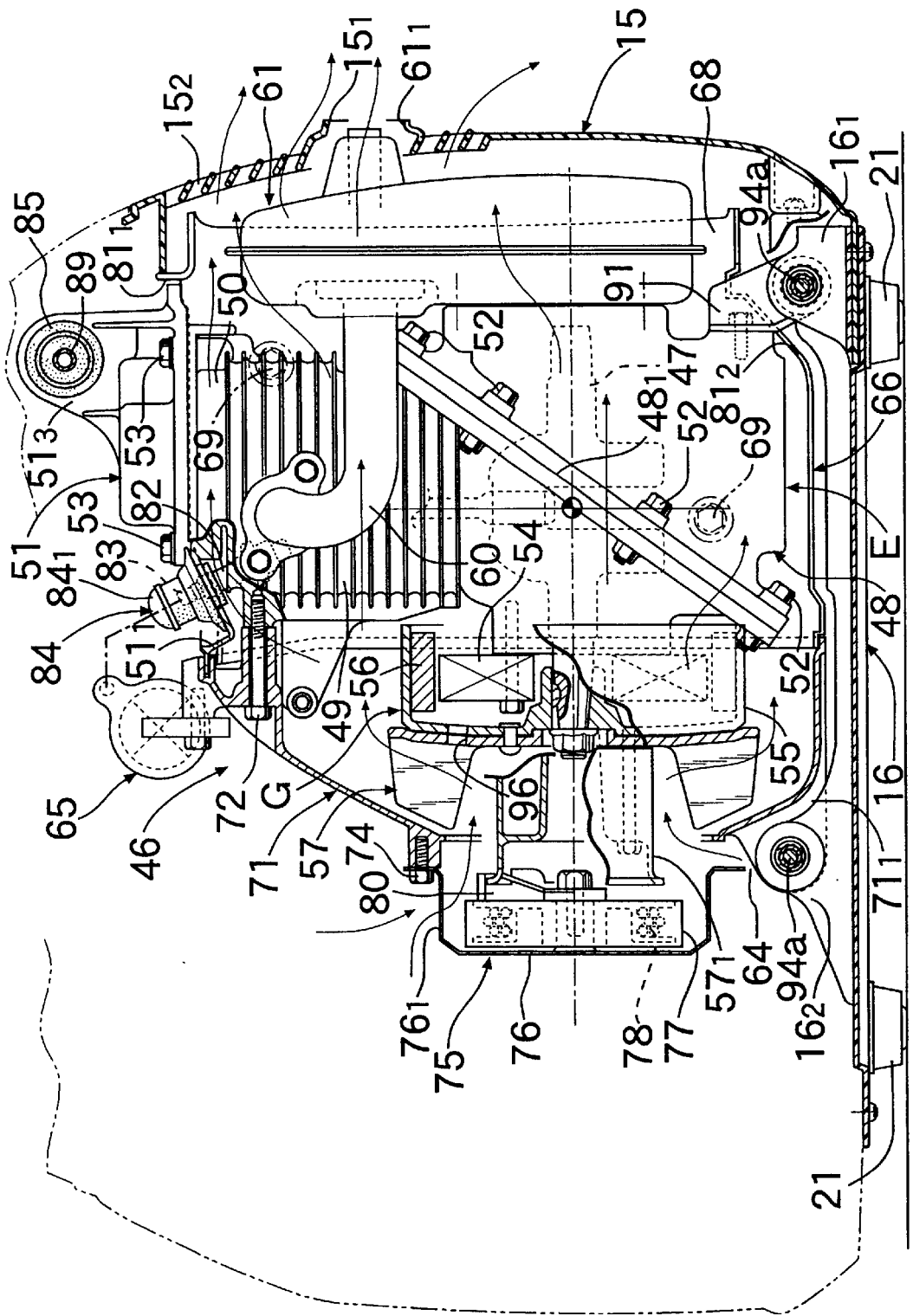
Figure 8:
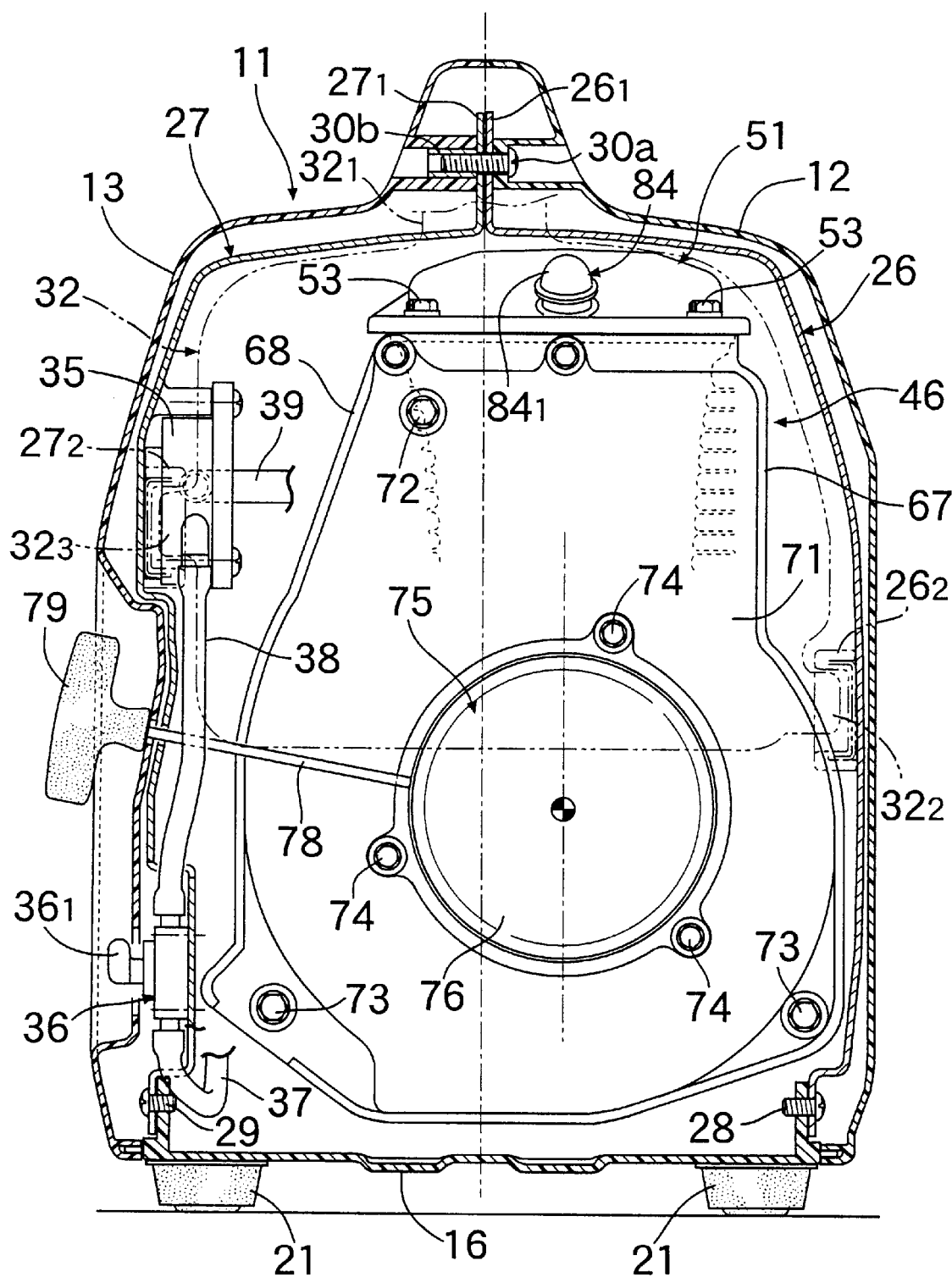

As can be seen from FIG. 7, the 4-cycle, one-cylinder engine E has a crankshaft 47 with an axis disposed longitudinally and includes a crankcase 48, a cylinder block 49, a cylinder head 50 and a head cover 51. The crankcase 48 is divided into two front and rear portions along a parting line $48_1$ inclined at 45° with respect to the axis of the crankshaft 47. The front portion of the crankcase 48, the cylinder block 49 and the cylinder head 50 are formed integrally with one another. The head cover 51 is detachably coupled to the cylinder head 50 by four bolts 53.

The generator G of an outer rotor type is mounted in a cantilever manner at the axial end of the crankshaft 47 protruding forwards from the crankcase 48, and is comprised of a stator having coils 54 fixed to a front surface of the crankcase 48, and a rotor having permanent magnets 56 which are fixed to an inner peripheral surface of a flywheel 55 fixed to the crankshaft 48, and which are opposed to outer peripheral surfaces of the coils 54. A cooling fan 57 is fixed coaxially to a front surface of the flywheel 55. The carburetor 41 is disposed on a right side of the cylinder head 50 of the engine E, and an air cleaner 59 (see FIGS. 5 and 9) is disposed in front of the carburetor 41 and connected to the carburetor 41 through an intake pipe 58. A box-shaped muffler 61 is connected to a rear end of an exhaust pipe 60 extending rearwards from a left side of the cylinder head 50 of the engine E, and is fixed to a rear surface of the engine E by three bolts 62, 62 and 63 (see FIG. 6).

An exhaust port $61_1$ is defined in a rear surface of the muffler 61 to face the exhaust gas discharge port $15_1$ in the rear cover 15 (see FIG. 7).

A shroud 66 made of a synthetic resin and covering the periphery of the engine E is divided into a left shroud half 67 and a right shroud half 68. The left shroud half 67 is fastened to left sides of the crankcase 48 and the cylinder block 49 of the engine E by two bolts 69, 69 (see FIGS. 3 and 5), and the right shroud half 68 is fastened to right sides of the crankcase 48 and the cylinder block 49 of the engine E by two bolts 70, 70 (see FIGS. 4 and 5).

The shroud 66 has front and rear surfaces which open. The outer periphery of the muffler 61 is fitted into the opening in the rear surface with a gap left therebetween, and a fan cover 71 made from aluminum by a die-casting process is fitted to cover the opening in the front surface. The fan cover 71 covers the generator G and the cooling fan 57 and is fastened at its upper portion to the cylinder head 50 of the engine E by a bolt 72 and at its lower portion to the crankcase 48 of the engine E by two bolts 73, 73 (see FIGS. 7 and 8).

A recoil starter 75 is fixed to a central opening in the fan cover 71 by three bolts 74. The recoil starter 75 includes a reel 77 rotatably carried on a recoil starter cover 76, a cable 78 wound at one end thereof around the reel 77 and passing at the other end thereof through the right reinforcing frame 27 and the right cover 13, a control knob 79 mounted at the other end of the cable 78, and a driving member 80 mounted on the reel 77 and capable of being brought into and out of engagement with a driven member $57_1$ integral with the cooling fan 57 (see FIGS. 7 and 8). Cooling-air introducing ports $76_1$ are defined in the recoil starter cover 76, and a cooling-air introducing port 64 is also defined between a lower end of the recoil starter cover 76 and a front lower portion of the shroud 66 (see FIG. 7).

When the cable 78 is drawn by the control knob 79 to rotate the reel 77, the driving member 80 actuated by a cam mechanism (not shown) can be brought into engagement with the driven member $57_1$ to rotate the cooling fan 57, whereby the crankshaft 47 connected to the cooling fan 57 through the flywheel 55 can be cranked or rotated to start the engine E. When the control knob is released, the driving member 80 is brought out of engagement with the driven member $57_1$, whereby the reel 77 is revered into the original position under the action of a return spring (not shown), while winding-up the cable 78 therearound.

Figure 9:
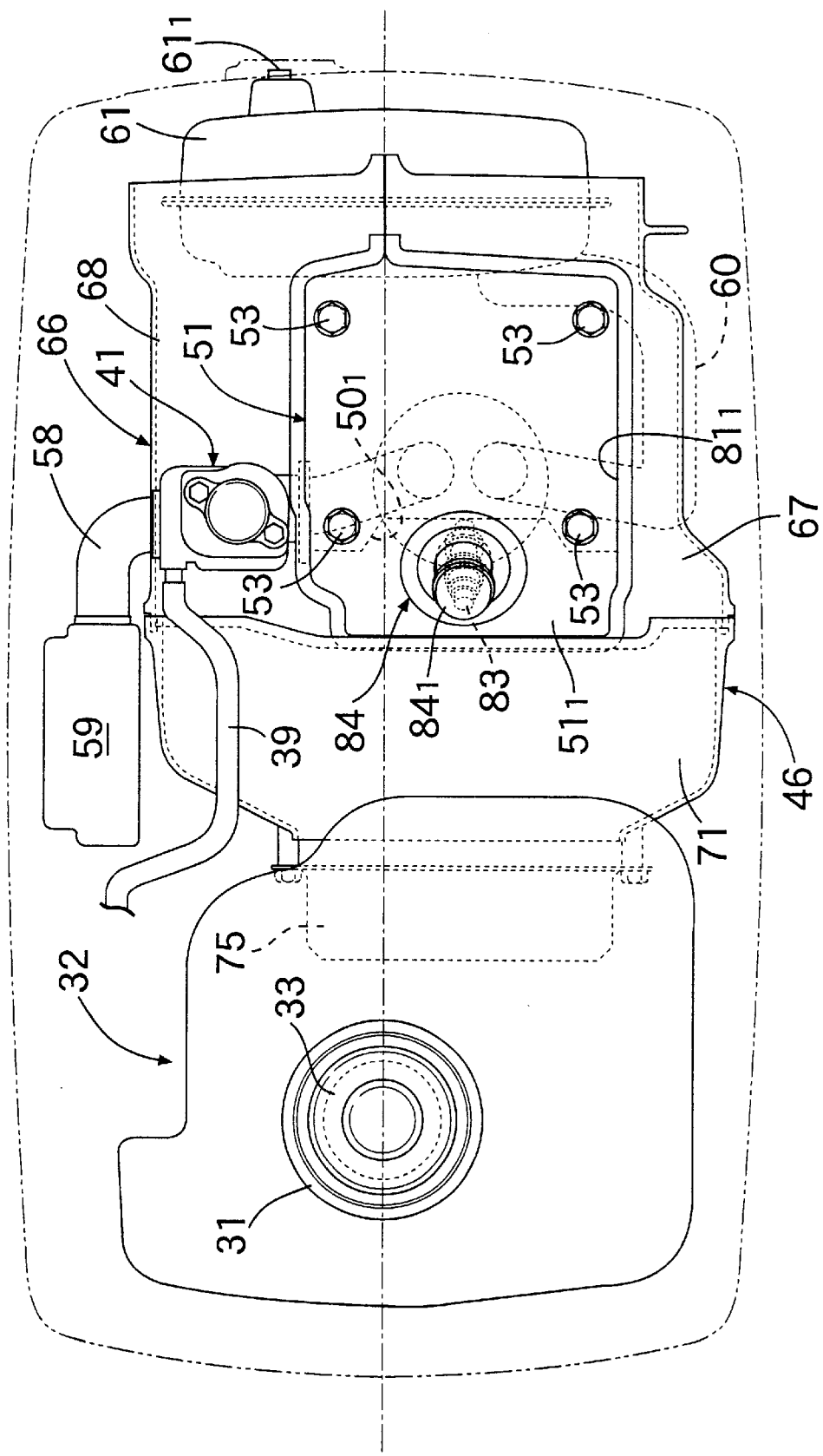
Figure 10:
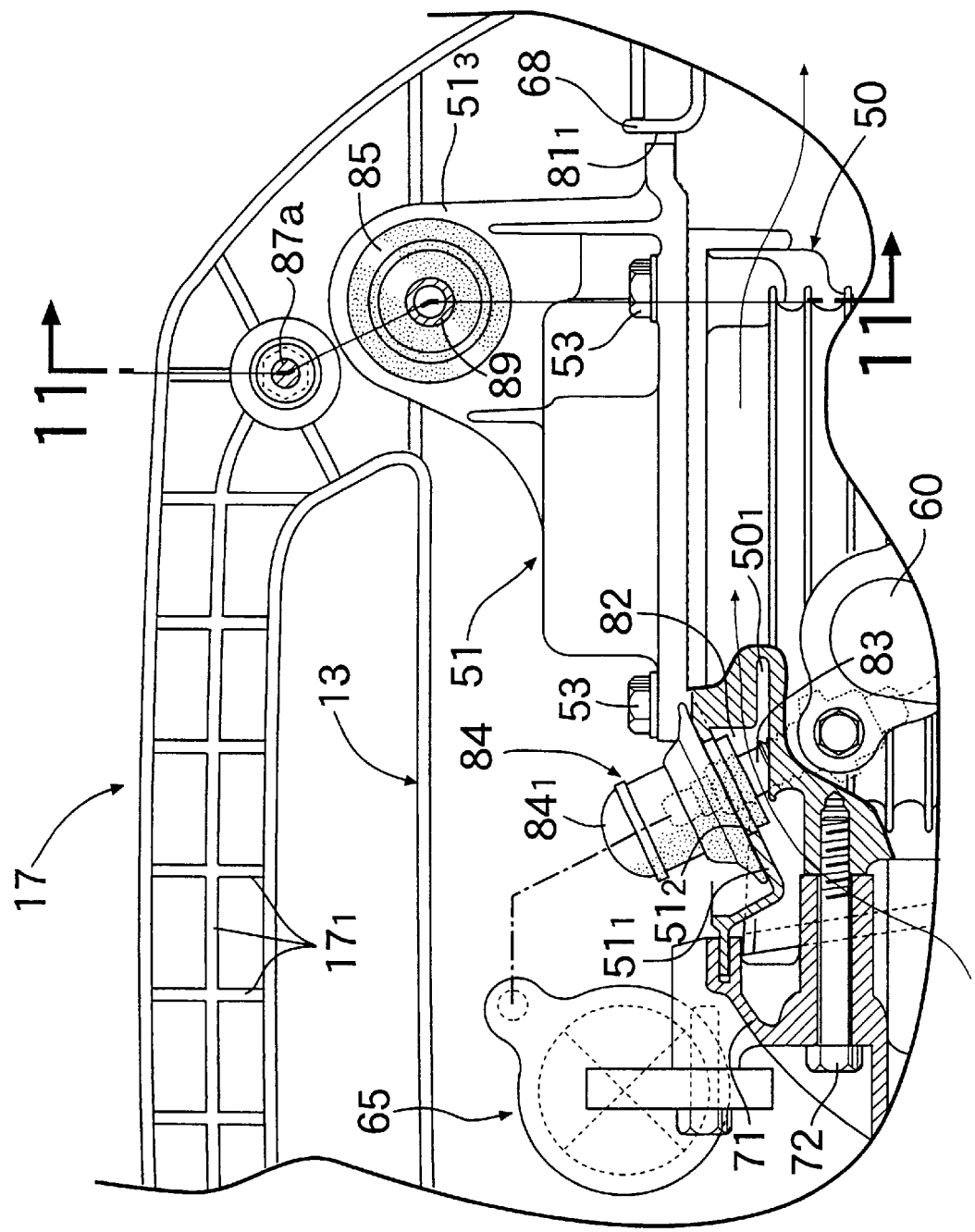

As can be seen from FIGS. 9 and 10, a rectangular opening $81_1$ is defined, so that it is surrounded by the left shroud half 67, the right shroud half 68 and the fan cover 71, and the head cover 51 of the engine E passes through the opening $81_1$ and protrudes to the outside of the shroud 66. An air baffle plate $51_1$ is integrally formed at a front portion of the head cover 51 and extends in such a manner that it is inclined forward and downward. A space forming an air passage 82 (see FIG. 10) is defined between the air baffle plate $51_1$ and a notch $50_1$ (see FIG. 9) defined in an upper surface of a front portion of the cylinder head 50. A guide member 84 for attaching and detaching a spark plug 83 to and from the cylinder head 50, is mounted in a spark plug attaching and detaching bore $51_2$ defined in a central portion of the air baffle plate $51_1$. An opening in an upper end of the guide member 84 is closed by a detachable cap $84_1$. An ignition coil 65 is mounted at an upper end of the fan cover 71 in proximity to the spark plug 83.

The guide member 84 faces the spark plug replacing lid $12_1$, of the left side cover 12 (see FIG. 2) and hence, the maintenance of the spark plug 83 can be carried out through the spark plug attaching and detaching bore $51_2$ only by opening the spark plug replacing lid $12_1$ and removing the cap $4_1$. In addition, if the left and right side covers 12 and 13 are removed, the maintenance of a valve operating mechanism covered with the head cover 51, e.g., the regulation of the tappet clearance and the like can be carried out easily, without removal of the left and right shroud halves 67 and 68, only by removing the head cover 51 exposed from the shroud 66.

Figure 11:
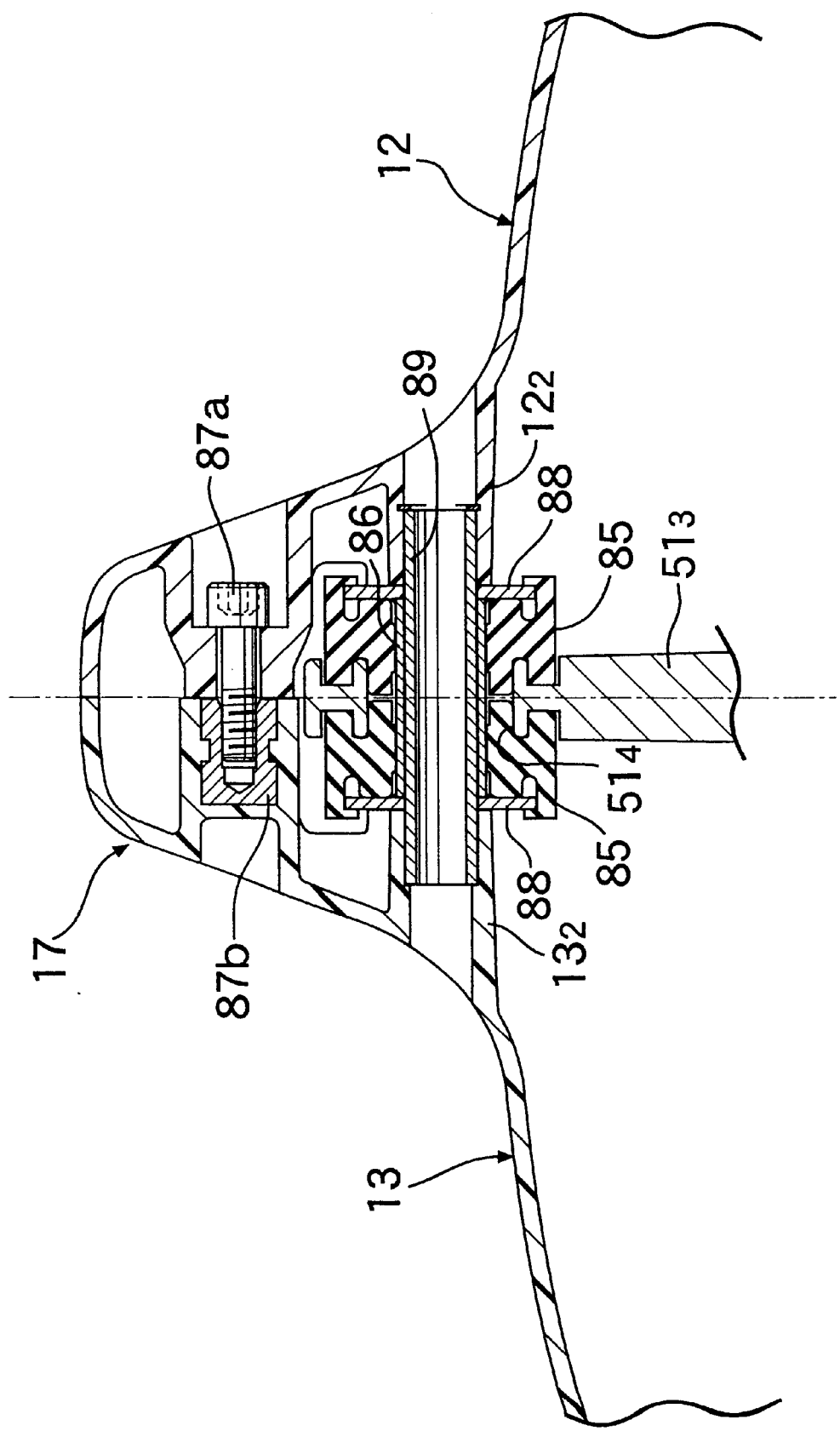

As can be seen from FIGS. 7, 10 and 11, a longitudinally extending plate-shaped support $51_3$ is projectingly provided on an upper surface of the head cover 51 of the engine. A pair of left and right rubber bushings 85, 85 are fitted into a circular support bore $51_4$ centrally defined in the support $51_3$, and a collar 86 is inserted through the inside of the bushings 85, 85. A bolt 87a is inserted at a rear portion of the carrying handle 17 from the side of the left side cover 12 and fastened to an embedded nut 87b provided in the right side cover 13. Bosses $12_2$ and $13_2$ are projectingly provided on the inner surfaces of the left and right side covers 12 and 13 in the vicinity of the bolt 87a. Washers 88, 88 are disposed at ends of the left and right rubber bushings 85, 85, and in this state, a connecting pin 89 passing through the washers 88, 88 and the collar 86, is fitted at its opposite ends over the bosses $12_2$ and $13_2$ of the left and right side covers 12 and 13, respectively.

Figure 6:
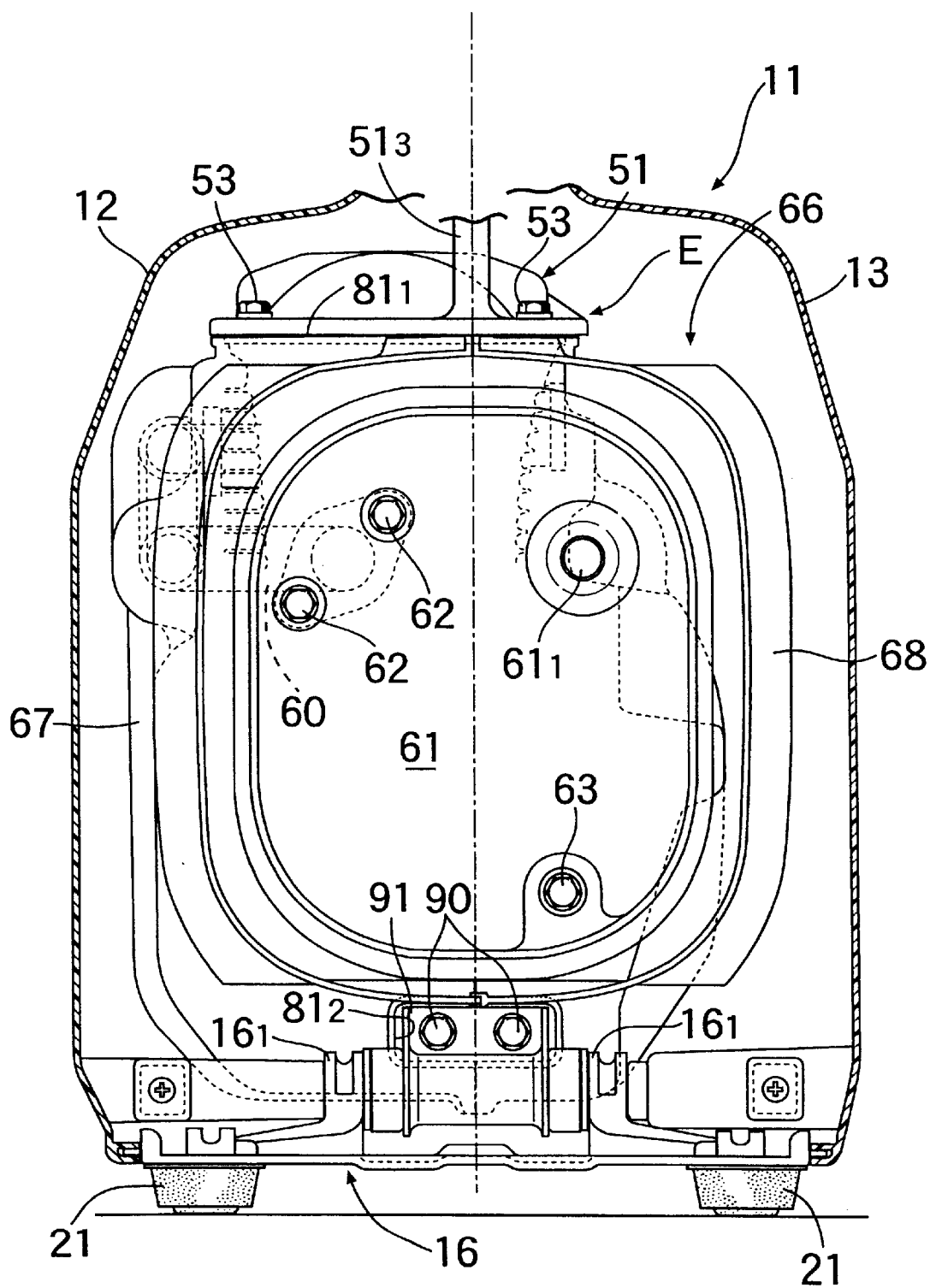
Figure 12:
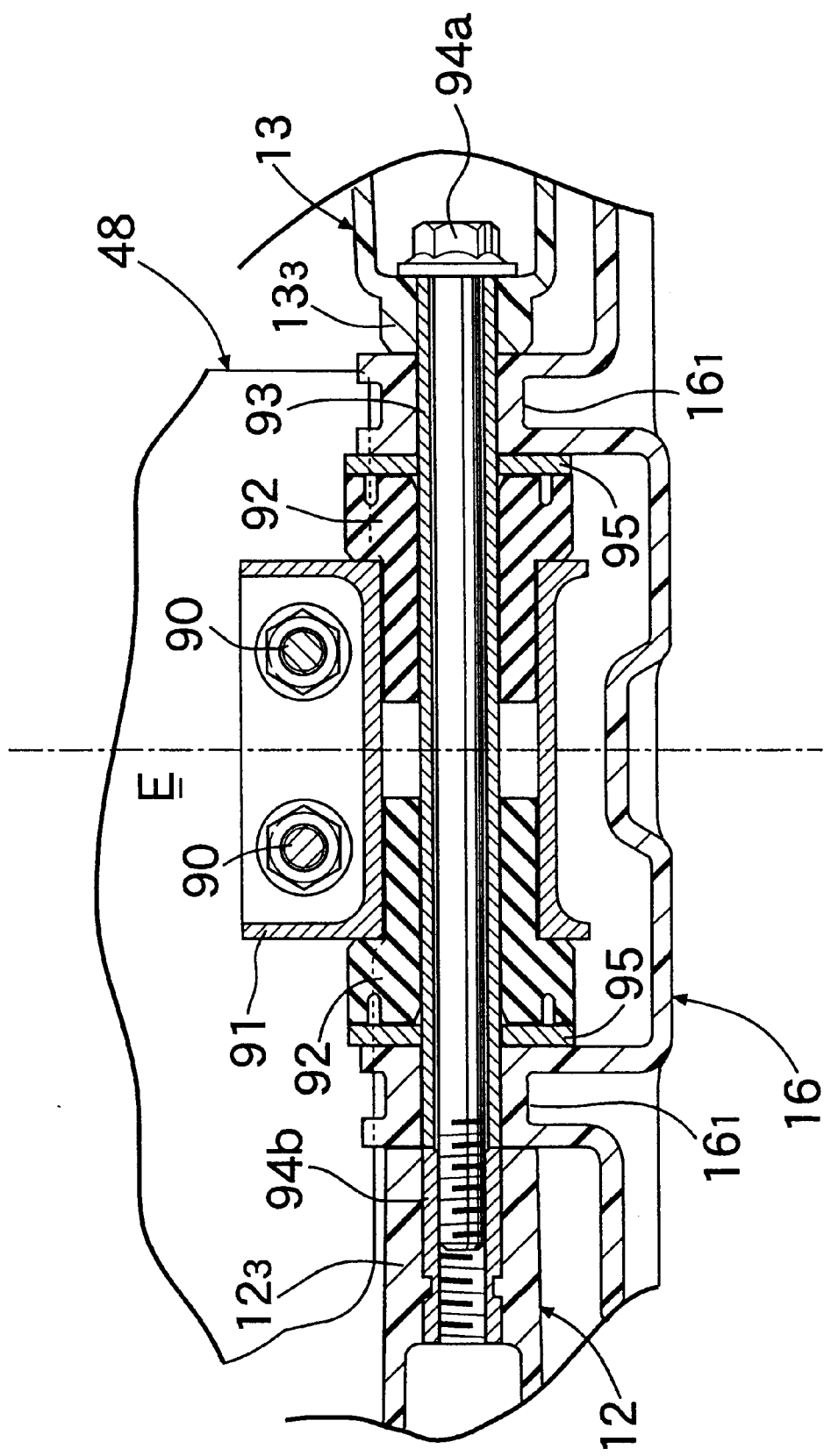
Figure 13:
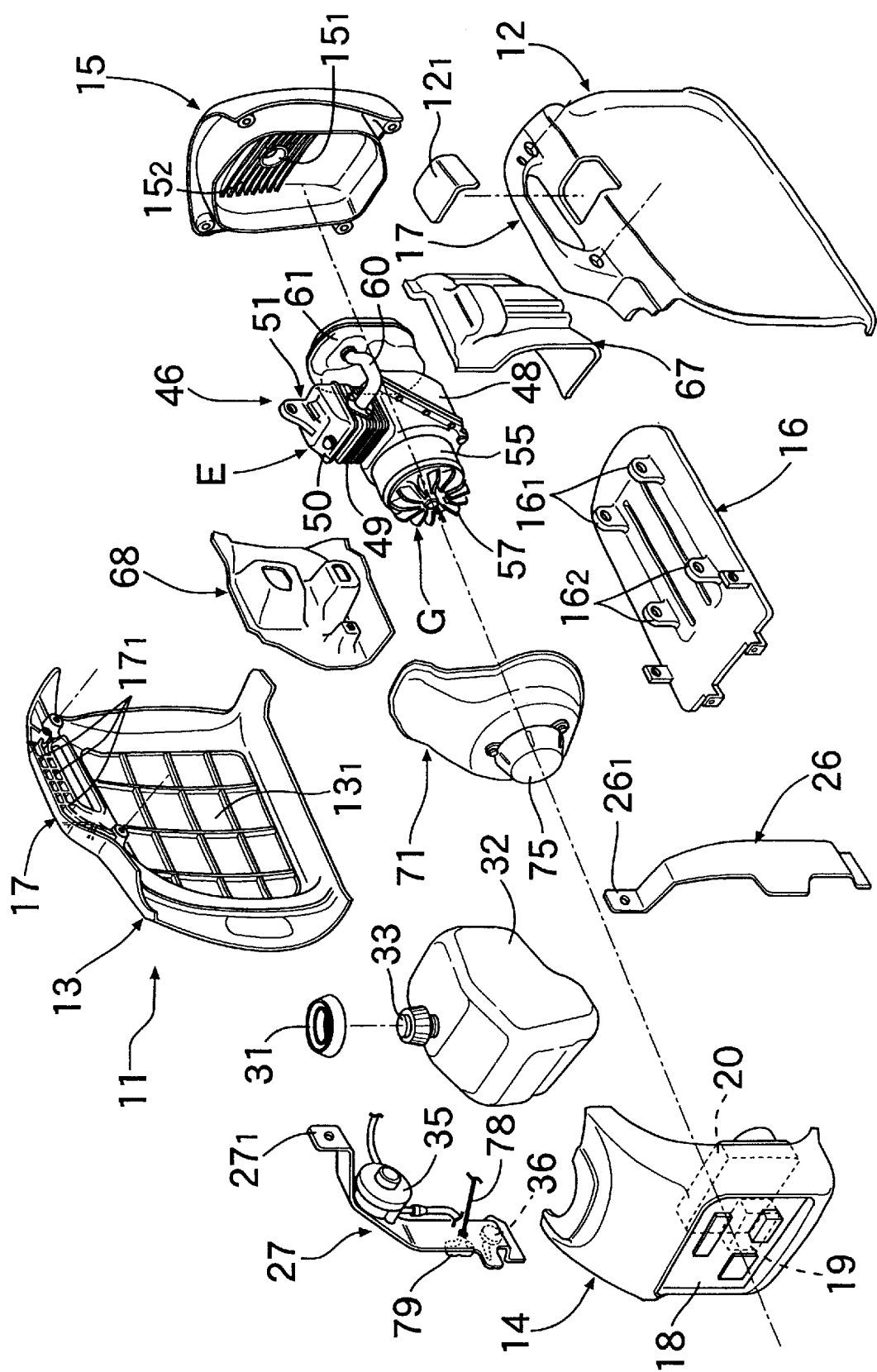

As can be seen from FIGS. 6, 7 and 12, a mounting bracket 91 is fixed to a rear lower portion of the crankcase 48 of the engine E by two bolts 90, 90. The mounting bracket 91 protrudes out of the opening $81_2$ in the rear lower portion of the shroud 66, and a pair of left and right rubber bushings 92, 92 are fitted over the bracket 91. A pair of left and right mounting ribs $16_1$, $16_1$ are formed on an upper surface of a rear portion of the undercover 16 of the case 11, and the rubber bushings 92, 92 are supported on an outer periphery of a central portion of a collar 93 bridging between the pair of mounting ribs $16_1$, $16_1$, with a pair of left and right washers 95, 95 interposed therebetween. Thus, the rear lower portion of the engine exposed from the shroud 66 is resiliently supported on the undercover 16 with the rubber bushings 92, 92 interposed therebetween by fastening a bolt 94a inserted from the boss $13_3$ of the right side cover 13 and passing through the collar 93 to an embedded nut 94b provided in the boss $12_3$ of the left side cover 12.

As can be seen from FIG. 7, a mounting bracket $71_1$, is integrally formed at a lower portion of the fan cover 71 and resiliently supported through a bolt 94a on a pair of left and right mounting ribs $16_2$, $16_2$ projectingly provided on an upper surface of a front portion of the undercover 16. The structure for supporting the mounting bracket $71_1$, is the same as the structure for supporting the mounting bracket 91 described with reference to FIG. 5.

In this way, in the power generating unit 46, the head cover 51 located on the upper side is resiliently supported on the carrying handle 17 through the rubber bushing 85, 85; the crankcase 48 located on the rear and lower side is resiliently supported on the undercover 16 through the rubber bushings 92, 92; and the fan cover 71 located on the front and lower side is resiliently supported on the undercover 16 through the rubber bushings 92, 92. Therefore, the weight of the power-generating unit 46 can be dispersed to various portions of the case 11 to prevent a load from being concentrated on a small portion of the case 11. Moreover, the vibration absorbing effect of the rubber bushings 85, 85 and 92 makes it possible not only to prevent the vibration of the engine E from being transmitted to the carrying handle 17, but also to prevent the case 11 from being resonant by the vibration of the engine E.

Particularly, when the carrying handle 17 is lifted to carry the engine generator, most of the weight of the power generating unit 46 including the engine E and the generator G is supported from the support $51_3$ of the head cover 51 via the rubber bushings 85, 85, the connecting pin 89 and the bosses $12_2$ and $13_2$ onto the carrying handle 17 of the case 11. Namely, the power-generating unit 46 is brought into a state in which it hangs down on the carrying handle 17, and thus, it is not necessary to support the weight of the power-generating unit 46 by the case 11 itself. Therefore, the thickness of the case 11 connected below the carrying handle 17 can be reduced, thereby not only providing a reduction in weight of the power-generating unit 46, but also providing a substantial increase in degree of freedom of the design such as the shape and the material of the case 11.

Moreover, since the head cover 51 protruding upwards from the opening $81_1$, in the upper surface of the shroud 66, is supported on the carrying handle 17, the entire height of the engine generator can be kept to a low level, as compared with a case where the head cover 51 is covered completely with the shroud 66, and the shroud 66 is supported at its upper end on the carrying handle 17.

When the carrying handle 17 is lifted, most of the weight of the power-generating unit 46 is applied to the rear portion of the carrying handle 17 through the head cover 51 of the engine E and for this reason, a bending load is applied to the carrying handle 17 and a portion of the case 11 in the vicinity of the carrying handle 17. However, the load can be dispersed to the front and rear of the carrying handle 17 without the bearing of the load by the left and right side covers 12 and 13, whereby the bending load applied to the carrying handle 17 and a portion of the case 11, in the vicinity of the carrying handle 17 can be alleviated, because the front portion of the undercover 16 supporting the lower portion of the power-generating unit 46, namely, the lower portion of the fan cover 71 and the lower portion of the crankcase 48, is connected to the front portion of the carrying handle 17 through the left and right reinforcing frames 26 and 27 each having a high rigidity.

In addition, the fan cover 71 made from aluminum by a die-casting process, is fastened to the crankcase 48 and the cylinder head 50 in a blocking manner, and the mounting bracket 91 of the crankcase 48 protruding from the shroud 66 covering the outer periphery of the fan cover 71, the crankcase 48 and the cylinder head 50, and the mounting bracket $71_1$, of the fan cover 71, are supported on the mounting ribs $16_1$, $16_1$; $16_2$, $16_2$ of the undercover 16 through the rubber bushings 92, 92. Therefore, the power-generating unit 46 can be supported reliably on the undercover 16 without a special support member such as an engine bed.

In a state in which the engine generator has been placed on a ground surface or a floor surface, most of the weight of the power-generating unit 46 is transmitted directly to the undercover 16 having the support legs 21. Therefore, even if the rigidity of the left and right side covers 12 and 13 is set at a lower value, a deformation due to a load is not produced.

Further, in the state in which the engine generator has been placed on the ground surface or the floor surface, the left and right side covers 12 and 13 can be separated from the undercover 16 by only removing the four bolts 30a, 87a, 94a, 94a. Therefore, the engine E and the generator G can be exposed without moving the engine generator sideways, whereby the maintenance thereof can be carried out easily.

The rubber bushings 85 and 92 correspond to vibration-damping members of the present invention.

The operation concerning the cooling of the engine generator will be described below.

When the engine E is operated to drive the generator G, the cooling fan 57 mounted on the flywheel 55 of the generator G is rotated within the shroud 66. Under a negative pressure generated with the rotation of the cooling fan, external air passes through the cooling-air introducing ports $14_1$, and $14_2$ (see FIGS. 3 and 4) in the front cover 14 and is introduced as cooling air into the case 11. Reference character $14_3$ is a guide for the cooling air introduced through cooling-air introducing port $14_2$. The cooling air is introduced through the cooling-air introducing ports $76_1$ defined in the recoil starter cover 76 and the cooling-air introducing port 64 defined below the recoil starter cover 76 into the fan cover 71 and the shroud 66 to cool the generator G, the engine E and the muffler 61 accommodated in the shroud 66. Thereafter, the cooling air passes through the gap between the shroud 66 and the muffler 61 and is discharged through the cooling-air discharge port $15_2$ to the outside of the case 11. Openings 96 (see FIG. 7) are defined in the flywheel 55 and the cooling fan 57, and the air heated within the generator G is drawn through the openings 96 into the shroud 66.

When the cooling air flows within the shroud 66, the flow of the cooling air within the shroud 66 can be smoothed to enhance the cooling effect, because the air baffle plate $51_1$ formed integrally on the head cover 51 of the engine E, defines the air passage 82 by cooperation with the fan cover 71 and the left and right shroud halves 67 and 68. Moreover, the cooling air flows directly through the inside of the fan cover 71 made from aluminum by the die-casting process and is coupled to the engine E and hence, the fan cover 71 exhibits a heat sink function to enhance the performance of cooling the engine E.

While the cooling air flows substantially rectilinearly from the front to the rear within the case 11, it cools the generator G which is a heat-generating member, the engine E and the muffler 61. Therefore, it is possible not only to keep the resistance to the flow of the cooling air to enhance the cooling efficiency, but also to keep the number of the cooling fans 57 to one, to reduce the number of parts. Noises emitted by the engine E and the cooling fan 57 are reduced effectively by the shroud 66 and the case 11 which doubly covers the engine E and the cooling fan 57, thereby enabling the quiet operation of the engine generator.

The rubber bushings 85 and 92 have been illustrated as the resilient members in the embodiment, but another resilient member such as a spring may be used. In addition, the carrying handle 17 is a portion of the case 11, but may be formed as a separate member and attached to the case 11.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An engine generating machine comprising a power-generating unit having an engine and a generator driven by said engine, a fuel tank, a fuel pump, a fuel cock, a case, and a pair of left and right reinforcing frames, said engine and generator being positioned in said case;

said case including, at least, an undercover, and a pair of side covers coupled to the left and right sides of said undercover;

said pair of left and right reinforcing frames being coupled at their lower ends to said undercover and extending upwards along the inner surfaces of said left and right side covers, the upper ends of said left and right reinforcing frames being coupled to each other; and said fuel tank being clamped between said reinforcing frames, and said fuel pump and said fuel cock being mounted on said reinforcing frames.

2. An engine generating machine according to claim 1, including a carrying handle at an upper portion of said case wherein the upper ends of the pair of left and right reinforcing frames are fastened to said carrying handle.

3. An engine generating machine according to claim 1 or 2, further including an inverter unit disposed below said fuel tank, and a vibration-damping member mounted on an upper portion of said inverter unit, opposed to the lower surface of said fuel tank.

4. An engine generating machine according to claim 2, further including first and second vibration-damping members, wherein said power-generating unit includes a rigid fan cover covering said generator and supported in a cantilever manner on said engine, and an upper portion of said engine is connected to said carrying handle provided at an upper portion of said case through said first vibration-damping member, and a lower portion of said engine and a lower portion of said fan cover are connected to said undercover through said second vibration-damping member, whereby said power-generating unit is resiliently supported on said case.

5. An engine generating machine according to claim 2, wherein the carrying handle includes a first half portion integrally formed with one side cover and a second half portion integrally formed with the other side cover.

6. An engine generating machine according to claim 5, wherein each one of the first and second half portions has reinforcing ribs formed in a lattice arrangement.

7. An engine generating machine according to claim 1, further including first and second vibration-damping members, wherein said power-generating unit includes a rigid fan cover covering said generator and supported in a cantilever manner on said engine, and an upper portion of said engine is connected to a carrying handle provided at an upper portion of said case through said first vibration-damping member, and a lower portion of said engine and a lower portion of said fan cover are connected to said undercover through said second vibration-damping member, whereby said power-generating unit is resiliently supported on said case.

8. An engine generating machine according to claim 1, wherein the coupled pair of left and right reinforcing frames are disposed interiorly of the case.

9. An engine generating machine according to claim 8, wherein the coupled pair of left and right reinforcing frames form an arch-shaped configuration.

* * * * *